E. F. W. ALEXANDERSON.
DYNAMO ELECTRIC MACHINE.
APPLICATION FILED OCT. 14, 1907.
949,345.
Patented Feb. 15, 1910.
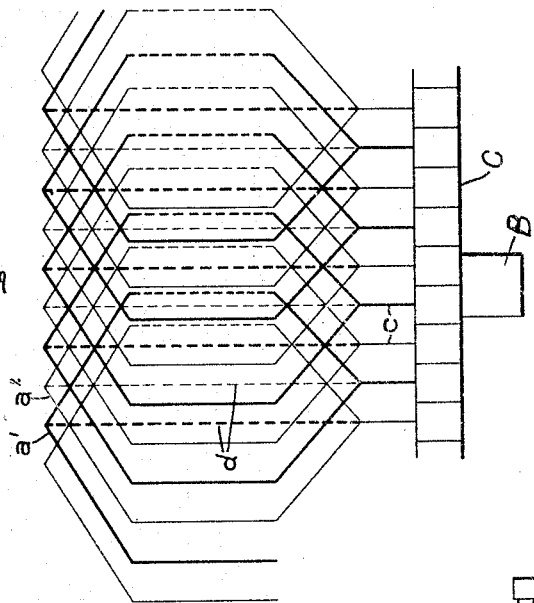
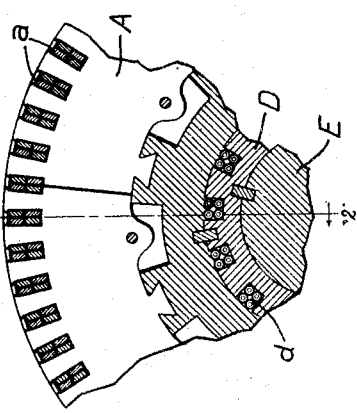
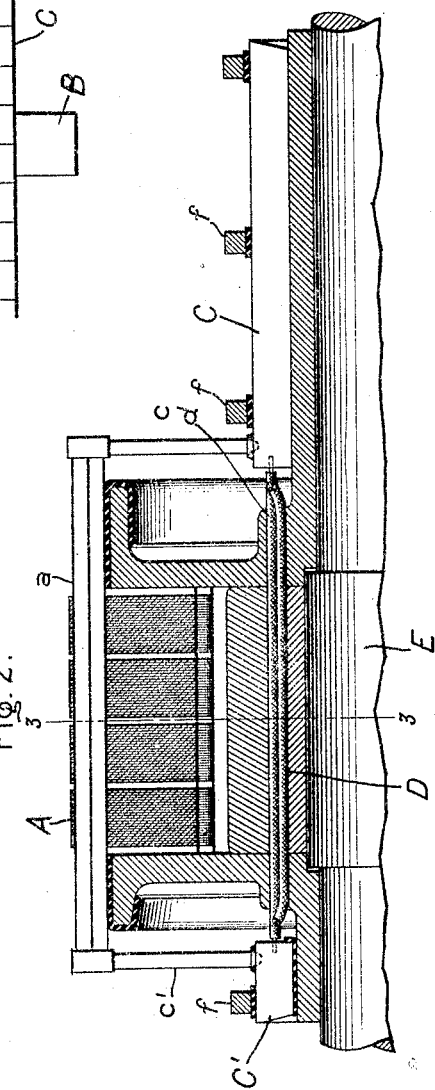
Witnesses:
George H. Tilden.
J. Ellis Glen.
Inventor:
Ernst F. W. Alexanderson,
by
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

DYNAMO-ELECTRIC MACHINE.

949,345.

Specification of Letters Patent.    Patented Feb. 15, 1910.

Application filed October 14, 1907. Serial No. 397,273.

*To all whom it may concern:*

Be it known that I, ERNST F. W. ALEXANDERSON, a citizen of the United States, residing at Schenectady, county of Schenectady, State of New York, have invented certain new and useful Improvements in Dynamo-Electric Machines, of which the following is a specification.

My invention relates to dynamo-electric machines of the commutator type, and particularly to large high-speed machines.

In large direct current generators designed for high speed operation the induced voltage between the terminals of a single coil, even if the coil has only a single turn, may be too high to impress on adjacent commutator segments if good commutation is to be obtained. It has, therefore, been proposed heretofore to provide twice as many segments as armature coils; to connect only alternate segments to the armature winding in the usual way; and to connect the remaining segments to the opposite ends of the coils by conductors running through or under the armature core. By means of this arrangement the voltage between adjacent commutator segments is reduced to one-half that of a single turn of the armature winding, but commutation difficulties are introduced by the fact that the current is shifted alternately from one end to the other of the armature coils, and that the leads which carry the current to the back end of the armature possesses very high self induction, because of their location in or under the armature core. This self induction gives rise to high reactive voltages which interfere with proper commutation.

The object of my invention is to reduce the voltage between adjacent segments to a fraction of that of a single armature turn without introducing any self-induction that can have a detrimental effect on commutation.

My invention consists in providing a plurality of armature windings connected to successive commutator segments, and connections from each end of each coil of each winding to the opposite end of a coil of another winding. These connections may be placed in or beneath the armature core without introducing any detrimental self induction, because as the current varies in one of these connections, an equal and opposite variation occurs in an adjacent connection, which neutralizes the inductive effect of the current variation in the first connection.

My invention further comprises certain structural features which will be hereinafter pointed out.

My invention will best be understood by reference to the accompanying drawings, in which—

Figure 1 shows a diagrammatical development on a plane surface of the armature winding and connections of a machine arranged in accordance with my invention; Fig. 2 shows a cross-sectional side elevation of the armature; and Fig. 3 shows a cross-sectional end elevation on the line 3—3 of Fig. 2, the line 2—2 of Fig. 3 being that on which the cross-section of Fig. 2 is taken.

Referring first to Fig. 1, $a^1$ and $a^2$ represent a pair of armature windings, each of the well-known multiple or lap type. For the sake of clearness these two windings are indicated by lines of different thickness. B represents a commutator brush bearing on the commutator C. The two windings $a^1$ and $a^2$ are connected by commutator leads $c$ to alternate segments of this commutator. Conductors $d$ connect each end of each coil of each winding to the opposite end of a coil of the other winding. It will be noted that points on the two windings connected by a conductor $d$ are equipotential points, and that the voltage between adjacent commutator segments is half the voltage between the terminals of a single armature coil. These conductors $d$ are shown in dotted lines to indicate that they may extend through or under the armature core. Current entering the brush B passes from each segment on which the brush bears both to the front of a coil of one winding and through a conductor $d$ to the back end of an adjacent coil of the other winding. As the commutator passes under the brush the current passing from the brush to one segment decreases, while the current passing to the adjacent segment increases. This means that as the current in one conductor $d$ decreases as the segment to which it is connected leaves the brush, the current in the adjacent conductor $d$ increases, so that equal and opposite variations occur in adjacent conductors $d$, which produce a mutual neutralization of inductive effects The preferred construction of the machine is shown in Figs. 2 and 3. The conductors $d$ are carried in slots in a sleeve D, which surrounds the armature shaft E. The laminated armature core A, carrying the conductors $a$ which form the windings $a^1$ and $a^2$ of Fig. 1, surrounds this slotted sleeve. An auxiliary commutator $C^1$ is placed on the opposite side of the armature core from the main commutator C, in order that the coil connections to the conductors $d$ may be made by means of commutator leads $c^1$ of standard construction. The leads $d$ connect equipotential segments of the two commutators; these segments being connected to coils of different windings. $f\,f$ represent the binding rings ordinarily employed in high speed commutator construction.

I do not desire to limit myself to the particular construction and arrangement of parts here shown, but aim in the appended claims to cover all modifications which are within the scope of my invention.

What I claim as new and desire to secure by Letters Patent of the United States, is,—

1. In a dynamo-electric machine, an armature having a plurality of armature windings connected to successive commutator segments, and connections from each end of each coil of each winding to the opposite end of a coil of another winding.

2. In a dynamo-electric machine, an armature having two armature windings connected to alternate commutator segments, and connections from each end of each coil of each winding to the opposite end of an adjacent coil of the other winding.

3. In a dynamo-electric machine, an armature having a plurality of armature windings each extending around the armature, said windings being connected to successive commutator segments, and conductors corresponding in number to the coils of said windings and extending through the armature and each connected at its opposite ends to coils of different windings.

4. In a dynamo-electric machine, an armature core, a main commutator on one side of said core, an auxiliary commutator on the other side of said core, a plurality of armature windings connected to successive segments of both commutators, and connections between equipotential segments of the two commutators, said equipotential segments being connected to coils of different windings.

5. In a dynamo-electric machine, a shaft, a slotted sleeve thereon, a laminated armature core surrounding said sleeve, a plurality of armature windings carried in slots in said core, and conductors carried in the slots in said sleeve each in electrical connection at its opposite ends with coils of different windings.

6. In a dynamo-electric machine, a shaft, a slotted sleeve thereon, a laminated armature core surrounding said sleeve, main and auxiliary commutators on opposite sides of said core, a plurality of armature windings carried in slots in said core and connected to successive segments of both commutators, and conductors carried in the slots in said sleeve connecting equipotential segments of the two commutators, said equipotential segments being connected to coils of different windings.

In witness whereof, I have hereunto set my hand this 11th day of October, 1907.

ERNST F. W. ALEXANDERSON.

Witnesses:
HELEN ORFORD,
MARGARET E. WOOLLEY.